(12) United States Patent
Changfan

(10) Patent No.: US 7,378,588 B1
(45) Date of Patent: May 27, 2008

(54) MELODY-BASED MUSIC SEARCH

(76) Inventor: Chieh Changfan, 34762 Chesapeake Ct., Union City, CA (US) 94587

( * ) Notice: Subject to any disclaimer, the term of this patent is extended or adjusted under 35 U.S.C. 154(b) by 0 days.

(21) Appl. No.: 11/530,904

(22) Filed: Sep. 12, 2006

(51) Int. Cl.
*G10H 7/00* (2006.01)

(52) U.S. Cl. ............................. 84/616; 84/609; 84/610

(58) Field of Classification Search ................ 84/601, 84/609, 610, 616
See application file for complete search history.

(56) References Cited

U.S. PATENT DOCUMENTS

| | | | |
|---|---|---|---|
| 4,591,928 A * | 5/1986 | Bloom et al. ................. 360/13 |
| 5,521,324 A * | 5/1996 | Dannenberg et al. ......... 84/612 |
| 6,121,530 A | 9/2000 | Sonoda | |
| 6,188,010 B1 | 2/2001 | Iwamura | |
| 6,678,680 B1 | 1/2004 | Woo | |
| 2003/0233930 A1* | 12/2003 | Ozick .......................... 84/610 |
| 2006/0117228 A1* | 6/2006 | Theimer et al. ............... 714/45 |
| 2006/0155479 A1* | 7/2006 | Knowles et al. .............. 702/19 |
| 2007/0163425 A1* | 7/2007 | Tsui et al. ..................... 84/609 |

* cited by examiner

*Primary Examiner*—George Nguyen
*Assistant Examiner*—Kawing Chan

(57) ABSTRACT

A music search engine is invented to find a desired song in the database by comparing the melodies. This invention comprises two major parts: a client-end and a server-end. The client-end converts various input formats into a note sequence and sends it to the server-end engine. The server-end then compares the note sequence with the melodies in the database and finds the closest match. This invention enables us to search music by its melodic content instead of titles, lyrics or other annotated information. Moreover, this invention tolerates inaccurate inputs so that even less skilled people can hum to the system with inaccurate melody and find the target song.

1 Claim, 5 Drawing Sheets

A block digram of a music search system in accordance with this invention

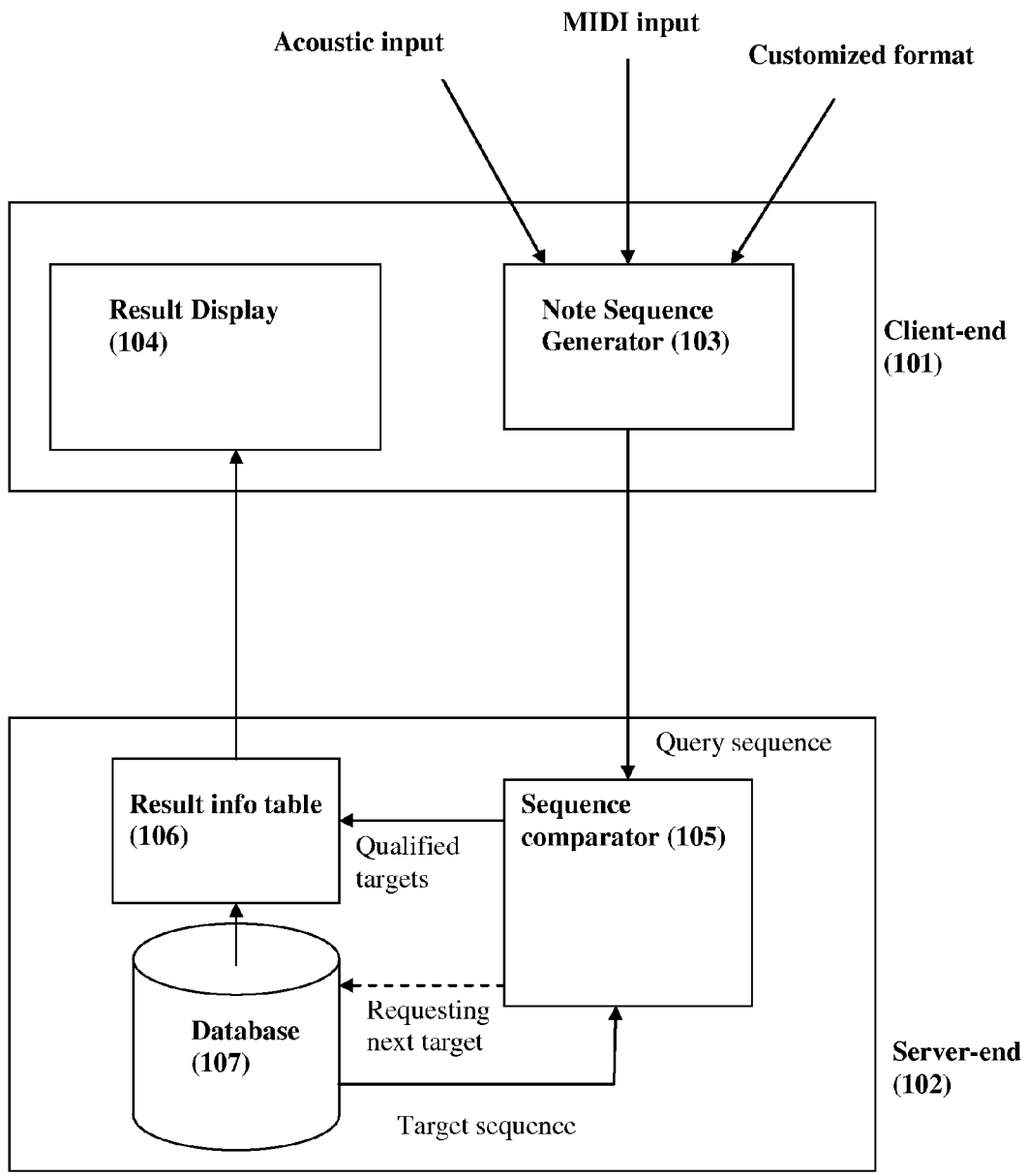
FIG. 1 A block digram of a music search system in accordance with this invention

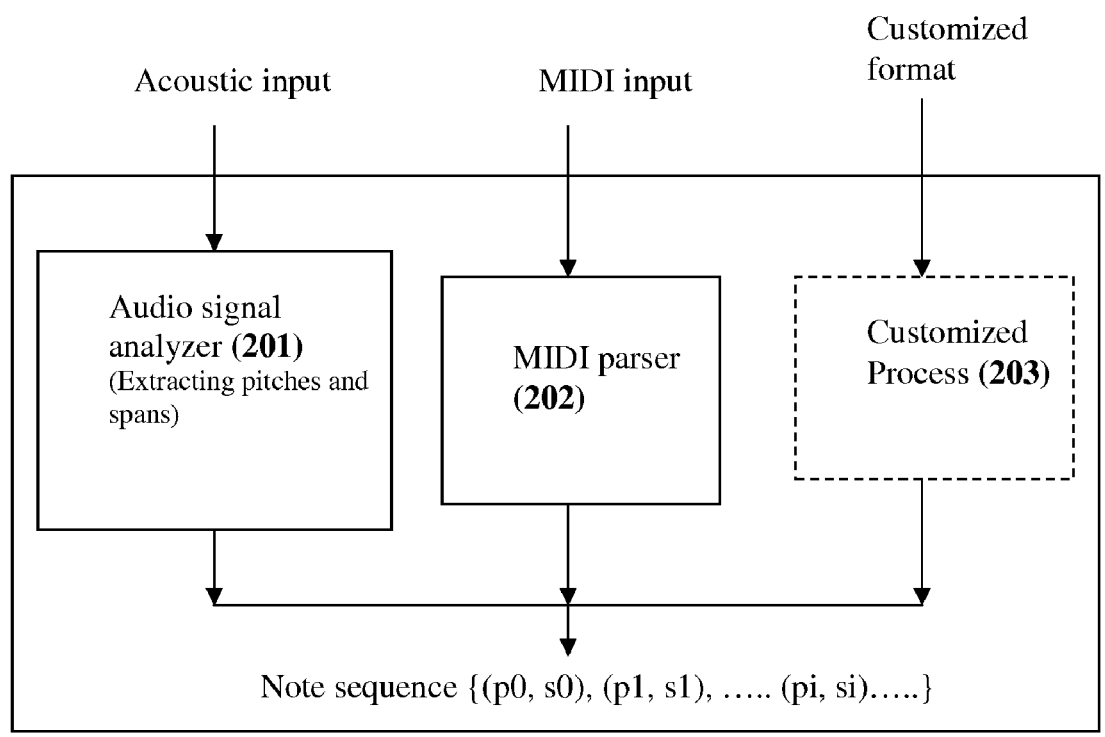
FIG. 2 Note sequence generator

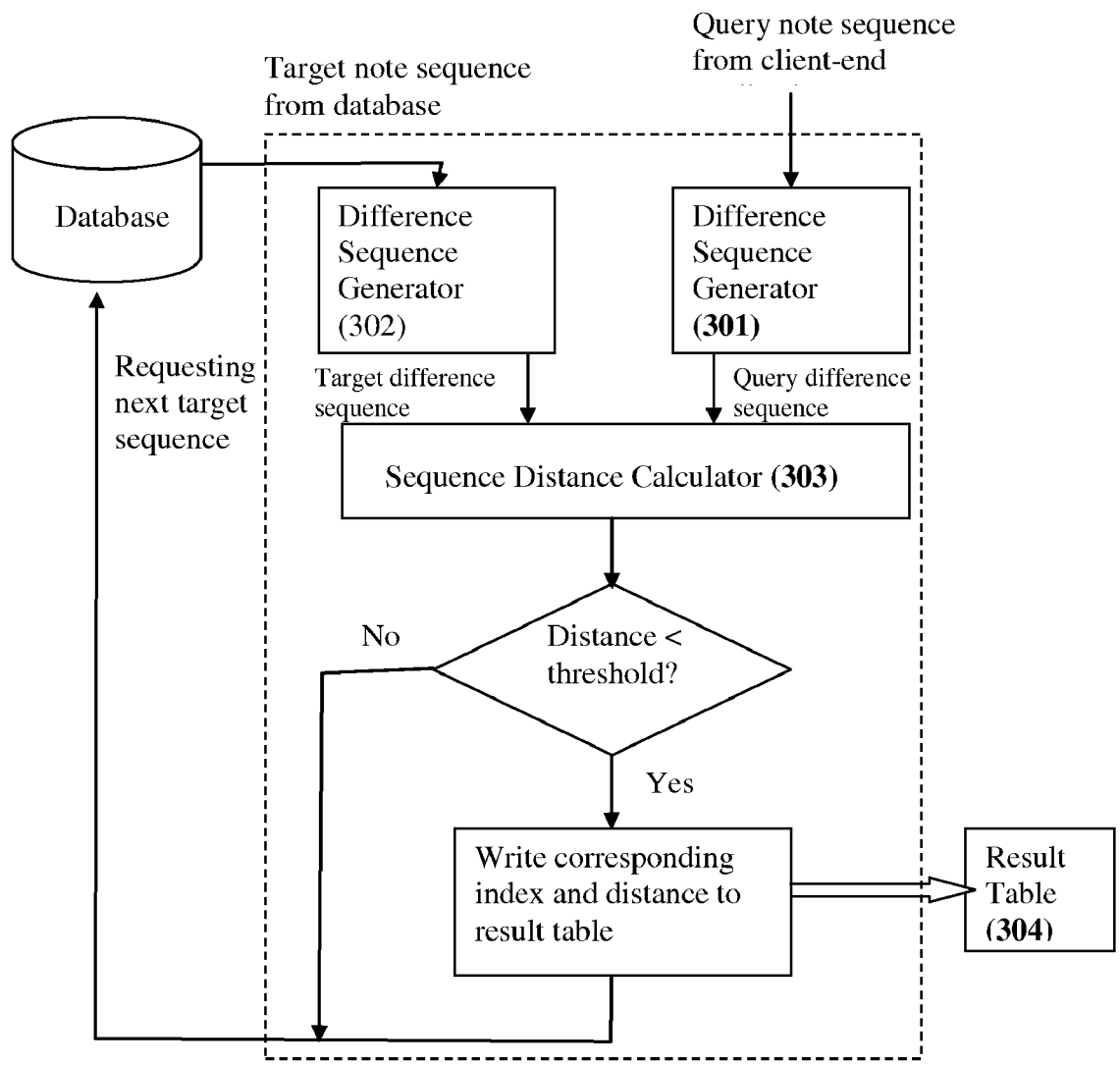
FIG. 3 A flowchart of the comparison engine

Note sequence {(p[0], s[0]), ..... (p[i], s[i]), (p[i+1], s[i+1]), ... (p[n], s[n])} Of n+1 element
Difference Sequence Generator (401)
Diff Sequence { ... (fp(p[i+1]-p[i]), fs(s[i+1]/s[i])), .... } of n element
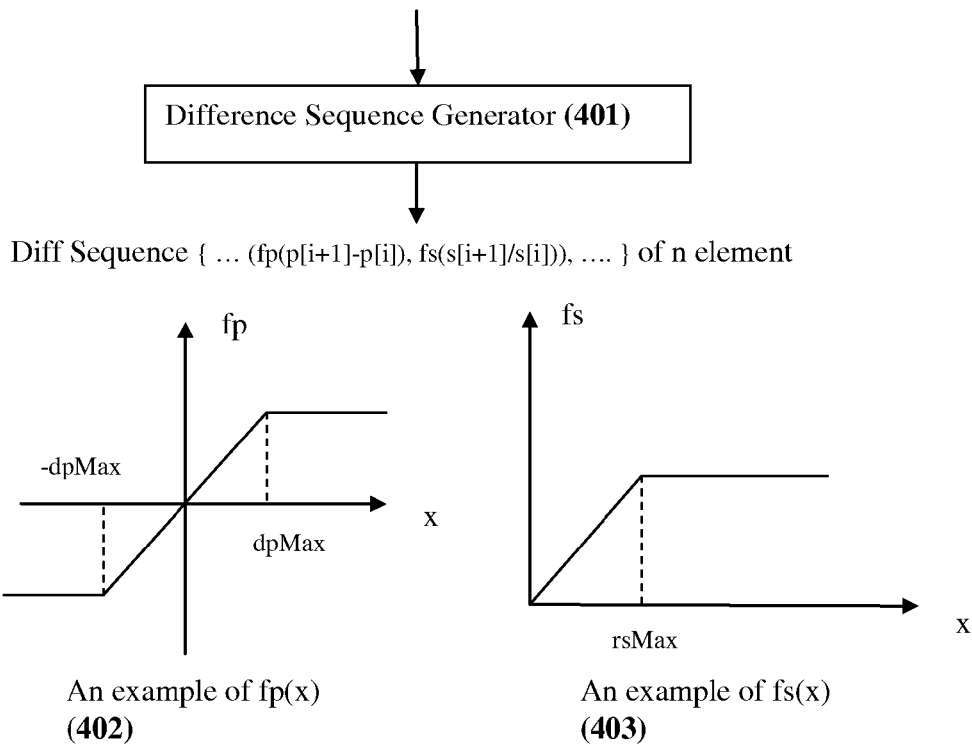
An example of fp(x)
(402)
An example of fs(x)
(403)
FIG. 4  A difference sequence generator and possible encoding functions
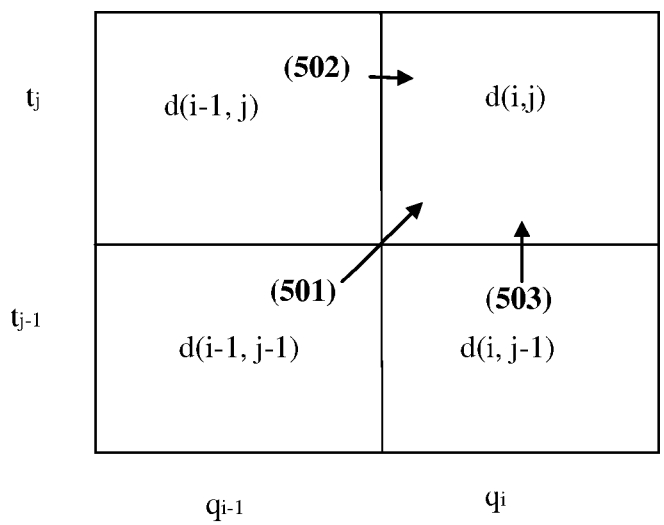
FIG. 5 Minimum distance of two subsequences

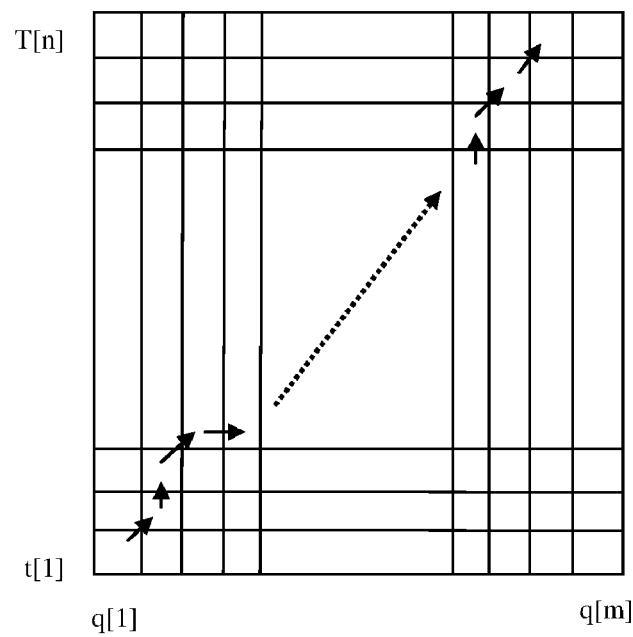
(a)
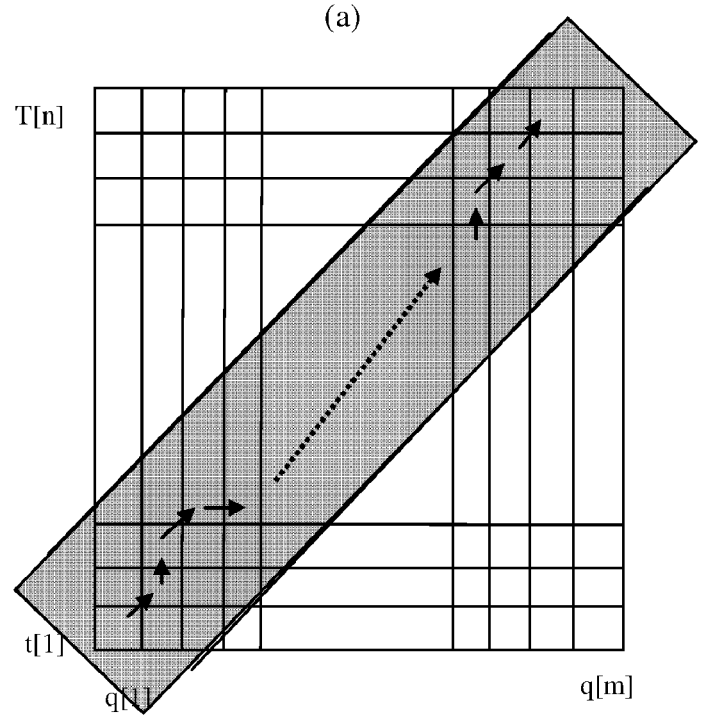
(b)
FIG. 6 Calculating the minimum distance of two sequences

MELODY-BASED MUSIC SEARCH

BACKGROUND OF THE INVENTION

1. Field of the Invention

This invention relates to a method to search songs by their melodies.

2. Description of the Related Art

In prior art, music search has been performed by searching some keywords, such as its title, lyrics, or the performers. However, if we remember songs by their melodies, or hear some music without knowing what it is, it is difficult to find this song with the prior methods.

In U.S. Pat. No. 6,121,530 [Sonoda, 1999], a web-based music search engine with melody input has been presented. It analyzes the whole database to find a threshold for adjacent pitch differences and another for span ratios, and then uses the thresholds to encode the pitch sequences into Up/Down/Equal category, and span sequences into Longer/Shorter/Equal. Finally, the encoded sequence from the query melody is compared with each sequence in the database to find the best match. However, the global thresholds might not best describe the melody contour of each song in the database. That is, melodies with relatively smaller pitch changes might be considered no change at all. This rough categorization leads to lots of false matches. Another problem is that if a note is missing in the input, or an extra note is added to it, the distance will be large due to misalignment of corresponding notes.

In U.S. Pat. No. 6,188,010, a comparison method by marking peaks and dips is invented. However, it also suffers from the note misalignment problem. Another problem is that note spans are not considered.

In U.S. Pat. No. 6,678,680, the note sequence is encoded into adjacent note differences and span ratios. The distance between the query and target is defined by the sum of the absolute differences between the two symbols from each coded sequence. This method also suffers from the note misalignment problem as the previous two. Moreover, when the duration information is encoded in the string, the distance calculated by the difference of two symbols does not correlate to the difference between two melodies successfully.

SUMMARY OF THE INVENTION

A principal object of this invention is to provide a music search method in which a user can input the query by a melody.

BRIEF DESCRIPTION OF THE DRAWINGS

FIG. 1 shows a block diagram of a music search system in accordance with this invention.

FIG. 2 shows a preferred embodiment of the client-end input device.

FIG. 3 is a flow chart of the comparison engine which calculates the distance between the query melody and a target melody.

FIG. 4 shows how a sequence of notes is encoded by the differences of the adjacent notes.

FIG. 5 describes the detail of finding the alignment of smallest distance between two encoded sequences.

FIG. 6 shows a preferred embodiment of the distance function between two elements in the encoded sequence.

DETAILED DESCRIPTION OF THE PREFERRED EMBODIMENT

Referring now to the drawings, wherein the showings are for purposes of illustrating a preferred embodiment of the present invention only, and not for the purposes of limiting the same, FIG. 1 is a block diagram of a music search system in accordance with the present invention. The system comprises a client-end (101) and a server-end (102). In (101), a note sequence generator (103) receives an input melody in various formats and converts it into a sequence of notes, in which each note contains a pitch value and a span value. The generated sequence, which is called query sequence in the context, is then sent to the server-end (102), where a comparator (105) calculates the distances between the sequence and each of the note sequences from the database, which is called target sequence in the context. The indexes of target sequences with smaller distance than a certain threshold are cached in a result table (106). The result in the table is then sorted by distance, and related information is sent back to the client-end.

FIG. 2 shows an example of a note sequence generator in (103). (201) is an audio signal analyzer which extracts pitches and spans from an acoustic signal, such as a microphone input or an audio file, and generates a note sequence. (202) is a MIDI parser which converts MIDI signals from a MIDI device or a file into a note sequence. (203) is a customized input where a user can plug in a process to convert the input signals of a customized format into a sequence of notes.

The detail of a comparison engine (105) is depicted in FIG. 3. (301) and (302) are the difference sequence generator which converts the original note sequence into a difference sequence by encoding the changes between adjacent notes. The distance between the query and the target difference sequence is then calculated in (303). The indexes of the target sequences with distances less than a certain threshold is cached in a table (304) along with the calculated distance. The table is then sorted by distance in an increasing order.

FIG. 4 shows an embodiment of the difference sequence generator which converts a sequence of n elements into a sequence of n−1 elements. The i-th element of the difference sequence is defined as $(dp_i, rs_i) = (f_p(p_{i+1} - p_i), f_s(s_{i+1}/s_i))$, where $dp_i$ is the pitch difference, $rs_i$ is the span ratio, and $p_i$ and $s_i$ are the pitch and span respectively of the i-th note in the original sequence. A simple embodiment of $f_p$ and $f_s$ is to define as $f_p(x)=x$ and $f_s(x)=x$; while a preferred embodiment is defined by the curve in (402) and (403), where the largest value of the difference and ratio is limited.

To compute the minimum distance between two difference sequences, conceptually, we can enumerate all possible alignments between the two sequences, compute the distance of each alignment, and find the alignment with the smallest distance. However, it is inefficient to calculate a lot of alignments which are obviously worse than previous ones. A dynamic programming technique can be applied to find the minimum distance between the two sequences. Given a query sequence $q_m$ of length m and a target sequence $t_n$ of length n, let $q_i$ be the subsequence of $q_m$ which contains the first i elements of $q_m$, and let $t_j$ be that of $t_n$ with the first j elements. The distance of $q_i$ and $t_j$, denoted as $d_{i,j}$, can then be found from the three possible sources as shown in (501), (502) and (503) of FIG. 5. (501) denotes the situation that the elements $q_r[i]$ and $t_j[j]$ are aligned, and the distance from this source is $d_{i-1,j-1} + \text{elem\_dist}(q_r[i], t_r[j])$. (502) denotes the situation that $q_r[i]$ is an extra element, and the distance is $d_{i-1,j} + \text{penalty}(q_r[i])$. The situation in (503) is symmetrical to (502). The function elem_dist is the distance between two elements, and penalty is the cost for each misalignment. The minimum distance of $q_i$ and $t_j$ can be found as the smallest of the distances from (501), (502) and (503). By calculating distances of $q_i$ and $t_j$ for all i<m and j<n, as shown in FIG. 6(*a*), we can find the minimum distance of $q_m$ and $t_n$ in the complexity of order m×n. A further speed-up is made possible by limiting the number of consecutive misaligned elements in a possible alignment. In this way, we only have to calculate the shaded area in the table shown in FIG. 6(*b*). The complexity is approximately reduced to the order of m+n.

The element distance of the two aligned elements $q_i[i]=(dp_{qi}, rs_{qi})$ and $t_j[j]=(dp_{tj}, rs_{tj})$, is defined as $E(dp_{qi}, dp_{tj}, rs_{qi}, rs_{tj})$. An embodiment of this distance function is to define it in proportion to $|dp_{qi}-dp_{tj}|$, and also in proportion to the larger of $rs_{qi}/rs_{tj}$ and $rs_{tj}/rs_{qi}$. That is, $E(dp_{qi}, dp_{tj}, rs_{qi}, rs_{tj})=k*(|dp_{qi}-dp_{tj}|)*Max(rs_{qi}/rs_{tj}, rs_{tj}/rs_{qi})$.

If we define penalty as 0, all misalignments will be ignored and the distances will not be increased. However, if too many misalignments happen between two sequences, these two sequences are likely to be from different melodies. In a preferred embodiment, we use a value in proportion to the span ratio, but relatively smaller than elem_dist. In this way, the penalty from misalignments is negligible until the cumulative penalty is too large.

The result table is sorted by distance in an increasing order, and sent back to the client-end along with useful information of the matched songs, such as the title, the performer, the composer, the best alignment to the query melody, and a hyperlink to the corresponding audio media.

What is claimed is:

1. A music search method comprising:
   (a) Extracting target difference sequences for each piece of music in the database, in which each element is a pair of adject pitch difference and adjacent span ratio from each piece of music in the database;
   (b) Extracting a query difference sequences in which each element is a pair of adjacent pitch difference and adjacent span ratio from the input melody;
   (c) Defining the misalignment penalty of each misaligned element between first and last aligned elements as a function in proportion to its relative span-ratio, or defining it as 0 if unlimited missing or extra notes are allowed;
   (d) Calculating the minimum distance among all possible alignments between the query sequence and the target sequence, where the distance of an alignment is defined as the sum of distances of aligned elements and misalignment penalties;
   (e) Retrieve information associated with the target sequences with a distance smaller than a threshold.

* * * * *